E. W. BAKEWELL.

DRIER.

No. 7,121. Reissued May 23, 1876

WITNESSES

A. L. Pessie.

J. L. Cirand

INVENTOR

Edwin W. Bakewell.

By Alexander Mason.

Attorneys

N. PETERS, PHOTO-LITHOGRAPHER, WASHINGTON, D. C.

UNITED STATES PATENT OFFICE.

EDWIN W. BAKEWELL, OF NORMAL, ILLINOIS.

IMPROVEMENT IN DRIERS.

Specification forming part of Letters Patent No. 172,688, dated January 25, 1876; reissue No. 7,121, dated May 23, 1876; application filed April 1, 1876.

*To all whom it may concern:*

Be it known that I, EDWIN W. BAKEWELL, of Normal, in the county of McLean and State of Illinois, have invented certain new and useful Improvements in Driers; and I do hereby declare that the following is a full, clear, and exact description thereof, reference being had to the accompanying drawings, and to the letters of reference marked thereon, which form a part of this specification.

This invention relates to certain improvements in apparatus for desiccating vegetables, fruit, grain, and other like materials; and it consists in two chambers of equal height, and any desired dimensions, one of which is provided with a suitable aperture or apertures for the admission of fresh air, and also with a furnace or other suitable apparatus for heating the air, and the other with an exhaust-shaft extending upward from a point at or near the bottom of the same, the two communicating with a horizontal chamber or series of the same above by means of apertures provided with suitable dampers, the first-mentioned chamber being designed for supplying heated air to the horizontal chamber or chambers, through which the fruit, vegetables, or grain are passed on cars or trucks, which are inserted and moved through suitable openings at the ends provided with doors for the purpose, the other chamber being designed to collect and carry off the air, which is exhausted by means of vertical shaft after becoming humid and foul from contact with the drying materials, as will be more fully hereinafter set forth.

Figure 1:
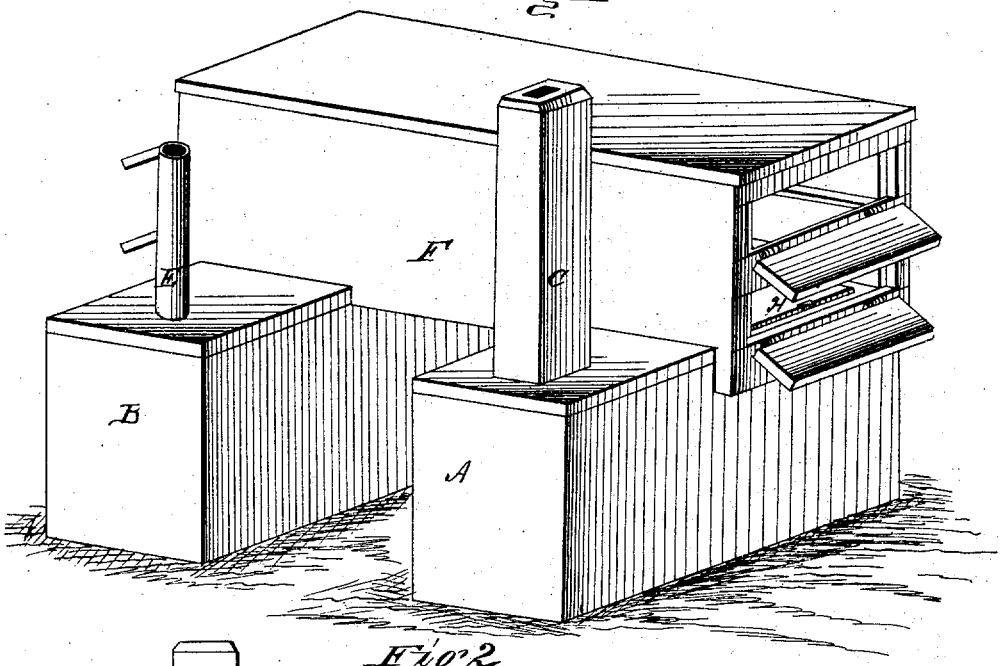
Figure 2:
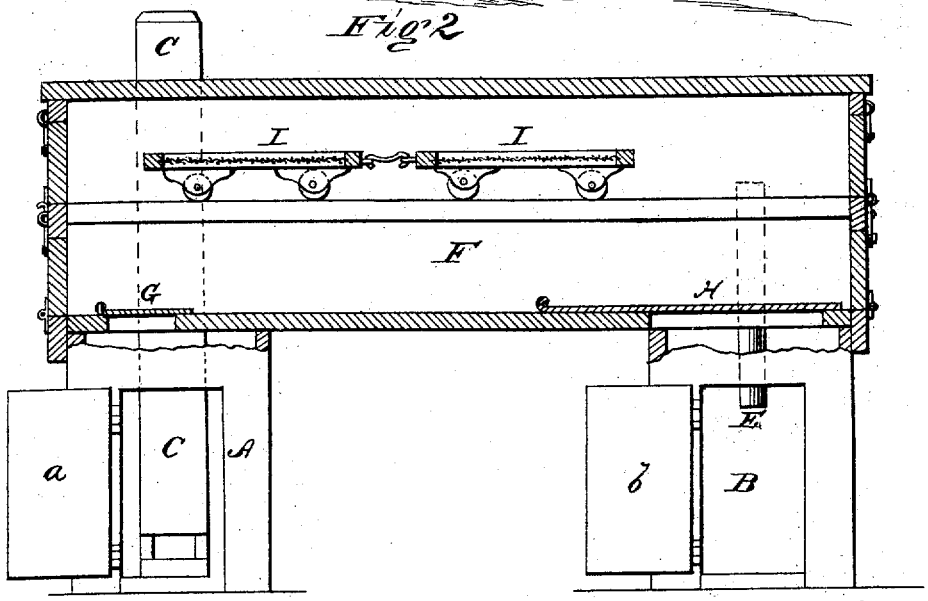

In the drawings, Figure 1 represents a perspective view of my improved apparatus; and Fig. 2 a partial front elevation and sectional view of the same.

The letters B and A represent two chambers constructed of any suitable material, and of equal height and any convenient dimensions. The chamber B is provided with a stove, furnace, or other heating device, which it is not deemed necessary to show, and with a stack or chimney, E, through which the products of combustion from said stove or furnace may escape. Said chamber is also provided with suitable apertures communicating with the open air, for supplying fresh air to the apparatus. In case a stove is employed, and located directly within the chamber B, the ash-pit or that portion of the stove below the grate-bars may be jacketed and connected with the open air by means of suitable flues or air-ducts, to prevent the smoke and products of combustion from being drawn through the drying-chamber and injuring its contents.

The chamber A is provided with a vertical shaft, C, extending down through the top, and terminating near the bottom of the same, the said shaft serving to exhaust the foul and humid air as it collects in the chamber A. Above the chambers B A, and resting on the tops of the same, is a horizontal chamber, F, or a series of such chambers may be employed arranged side by side, said chamber or chambers communicating at opposite ends with the chambers B and A through suitable apertures provided with regulating-dampers H and G, and are provided with doors at each end for the purpose of inserting the cars or trucks I I, which contain the fruit, and are adapted to run on rails through said chamber, as clearly indicated in the drawings. The letters *b a* represent doors for closing the chambers B A during the operation of the apparatus.

The operation of my apparatus is as follows: The chambers B and A being properly closed, and also the horizontal chamber above, and the chamber B properly heated, the dampers leading to the horizontal chamber having been previously opened, the air will pass upward into the chamber F by reason of its lighter specific gravity as it becomes heated, fresh air entering the chamber B through the apertures or air-ducts to supply its place. The air, as it passes around and over the fruit, vegetables, or grain in the cars or trucks, which have been previously run into the chamber F, becomes charged with moisture and impurities from the drying substances, and passes on to the opposite end of said chamber. From thence it is drawn into the chamber A by the draft through the same created by the exhaust-shaft, and is finally carried out into the external air.

Having thus fully described my invention, what I claim, and desire to secure by Letters Patent, is—

The combination, substantially as hereinbefore described, of the hot-air chamber B, provided with suitable inlet-apertures, the foul-air chamber A, provided with exhaust-shaft C, and the horizontal chamber F, communicating with said chambers by means of apertures provided with regulating-dampers, the whole arranged to operate as herein set forth and shown.

In testimony that I claim the foregoing I have hereunto set my hand this 29th day of February, 1876.

EDWIN W. BAKEWELL.

Witnesses:
C. L. EVERT,
W. T. GRINNELL.